United States Patent Office 3,083,078
Patented Mar. 26, 1963

3,083,078
BASE RECOVERY FROM WASTE LIQUOR
Donald F. Manchester and Shafi U. Hossain, Sault Ste. Marie, Ontario, Canada, Martin E. Gilwood, Oceanside, N.Y., and Albert B. Mindler, Princeton, N.J., assignors to Abitibi Power & Paper Company, Iroquois Falls, Ontario, Canada, a company incorporated of Canada
No Drawing. Filed Sept. 21, 1959, Ser. No. 840,998
10 Claims. (Cl. 23—49)

This invention relates to a process for the recovery of the base from the spent or waste liquor resulting from the preparation of wood pulps.

There have been numerous patents concerned with ion exchange processes for the recovery of the base from waste liquor using various ion exchange materials but there has been no description of an economic process enabling the base to be recovered efficiently without costly preliminary steps such as smelting.

The object of this invention is to provide an improved process in accordance with which the base is recovered at a high degree of efficiency.

The waste liquor may be that produced during a sulphite process in which wood chips are cooked with a solution containing as its effective constituents, sodium, ammonium, magnesium, or calcium bisulphite, together with an excess of free sulphurous acid. The waste liquor may alternatively be that produced during a bisulphite process in which wood chips are cooked with a substantially stoichiometric amount of sulphur dioxide to form sodium or ammonium bisulphite in the absence of excess sulphurous acid, as described in British Patent 771,571. The waste liquor may also be that obtained from a neutral sulphite semichemical cook. The waste liquor may, therefore, be that of any neutral or acidic sulphite process for producing wood pulp. The cyclic aspects of the process of this invention would not, however, be applicable to a kraft process, as although the base could be absorbed, a reusable cooking liquor to give a cyclic process could not be provided. The base to be recovered by the process of this invention may be sodium, ammonium, or magnesium. The process of this invention could be applied to the recovery of calcium, but the process would not be economic.

The ion exchange material should be in the hydrogen form and should be strongly acidic, that is to say, having a pK value of less than about 3. It is preferred that the active groups of the ion exchange material be sulphonic groups. An example of a suitable ion exchange material is sulphonated polystyrene, such as that sold under the trade name "Permutit Q" by The Permutit Company, New York, which has a pK value of about 2.1. Ion exchange materials having mixed sulphonic and carboxylic groups are satisfactory, such as sulphonated coal which is available from The Permutit Company under the trade name "Zeo Karb," and has a pK value of about 2.8. Weakly acidic ion exchange materials, such as those having carboxylic acid as their only active group, are unsatisfactory because the pK values are too high and there is a higher affinity for hydrogen than sodium when the material is in the hydrogen form, with the consequence that adsorption is poor.

A typical procedure for producing sulphonated polystyrene ion exchange resin is as follows:

The crosslinked polystyrene is prepared by reacting a mixture of 90 parts by weight of vinyl benzene with 20 parts by weight of a 50% crosslinking agent, such as divinylbenzene, in water containing up to 1% catalyst such as benzoyl peroxide and 100 parts of the 1% stabilizer solution such as carboxymethyl cellulose under the proper agitating conditions at a temperature of 60 to 90° C. The mixture is stirred at a rate to disperse the styrene-containing solution in the aqueous medium as droplets corresponding approximately to size of the resin granules desired as product. The reaction period is approximately 24 hours with a gradual increase of temperature within the range specified. The resulting crosslinked polystyrene beads of approximately 16 to 60 mesh are washed with water and dried.

These polymer beads are then sulphonated by first swelling the beads with a suitable solvent and then sulphonating these swollen beads with a sulphonating agent at elevated temperatures. The solvent can consist of at least 15% of the polymer weight of tetrachloroethylene. The sulphonating agent can be sulphuric acid equal in weight to the polymer beads and of the highest concentration at a temperature of 100 to 200° C. The liquor is then separated from the sulphonated beads and the beads are then washed with water at a rate to gradually displace acid to avoid cracking.

Another suitable resin is a sulphonic resin with a phenol-formaldehyde base as described in Wassenegger U.S. 2,228,159 and Bauman U.S. 2,466,675.

The preferred size of the ion exchange material is 16–50 mesh. The screen analysis of sulphonated polystyrene ion exchange resin prepared in accordance with the foregoing procedure is as follows:

[Basis: Wet Screening and U.S. Standard Sieves]

| Mesh | Percent by volume | |
|---|---|---|
| | Range | Typical |
| +16 | 0–5 | 4 |
| −16 +30 | 50–80 | 66 |
| −30 +50 | 20–40 | 28 |
| −50 | 0–5 | 2 |

With regard to the preliminary treatment of the waste liquor, it is not necessary that any costly pretreatment, such as smelting, be used. This process deals with unmodified spent liquors. It may be desirable to use a preliminary steam stripping step if acid sulphite waste liquor having a high free sulphur dioxide content is used as free sulphur dioxide tends to reduce the efficiency of the recovery, but it has been found that steam stripping is not necessary even when the pH of the waste liquor is as low as 2.6. It is recommended that steam stripping or some other means of raising the pH be used where the pH of the waste liquor is below 2.5. The pH of the waste liquor treated in accordance with this invention will, therefore, have a pH of at least 2.5.

Another pretreatment which may be desirable is decalcification, by the use of a bed of sulphonated polystyrene in the appropriate state, for example, in the sodium state when a sodium base spent liquor containing calcium is to be treated. Such calcium may originate in the wood, water or other source. If calcium is allowed to build up in a cyclic system the cooking liquor formed from the regenerated solution will be a mixed base and the chips will not be as smoothly cooked as with a sodium base. It will be appreciated, however, that a proportion of calcium in the cooking liquor may not be objectionable. In a cyclic system in the absence of a pre-softener, calcium will build up to a levelling off point and the cook will remain a predominantly sodium base cook. Preferably the cooking liquor should be passed in one direction (e.g. downflow) through a restrained bed of sodium form sulfonated polystyrene ion exchanger and when excessive amounts of calcium are evident in the ion exchanger effluent, the restrained ion exchanger bed should be regenerated by passing a sodium salt solution in the opposite direction (e.g. upflow) through the ion exchanger.

Considering now the essential steps of a process in accordance with this invention, it has been found that the combination of (A) a restrained bed of ion exchange material; (B) loading and eluting countercurrent; and (C) elution under pressure, provides an economical cyclic process for the recovery of the base.

A restrained bed of ion exchange material, as distinct from a shifting or fluidized bed, permits an advantage to be obtained from differential loading of the particles. During upflow loading the lower portions of the bed will be gradually loaded to capacity, but the top portions will be lightly loaded. Upon downflow elution the top portions will be thoroughly regenerated, while the bottom portions will not, but by virtue of their high sodium content will raise the sodium in the regenerant solutions, which is one of the objectives of this process. The full advantage of such a sequence can only be taken when there is little or no relative movement of the particles. A restrained bed in combination with countercurrent flow accordingly provides improved efficiency. It may be noted that merely filling an ion exchange column initially does not produce a restrained bed, as shrinkage occurs with the early process cycles leaving a space with the consequence that the particles of ion exchange material acquire freedom of relative movement during upflow operation. A restrained bed may be obtained by packing the ion exchange material hydraulically and/or by preliminary process cycles and then restraining the bed so that there will be freedom of movement neither of the bed as a whole nor of the individual particles. The bed may be restrained by means of screens.

Loading is preferably carried out to a stage just short of the break-through point, that is to say, the point at which the sodium concentration in the effluent rises sharply due to the column being completely loaded. With sulphonated polystyrene, the leakage up to break-through remains fairly constant, whereas with some other ion exchange materials, such as sulphonated coal, the leakage rises as additional waste liquor is passed through so that it may be desirable to terminate the loading well short of the break-through point.

The temperature at which loading is carried out is not critical and depends on process factors as well as the stability of the particular ion exchange material. Sulphonated polystyrene resins, for example, are stable to 140° F.

Although the loading step has been described in terms of upflow pumping, it will be appreciated that loading could also be downflow, provided that the elution is always countercurrent to the loading.

The concentration of the sodium in the waste liquor is not found to be critical. The average values are about 0.5% sodium in an acid sulphite system and about 2% sodium with a neutral sulphite semi-chemical system. It has been found that dilution of the neutral sulphite semi-chemical waste liquor with 2 to 5 volumes of water slightly improves the efficiency of the recovery.

Considering now the elution stage, it has been pointed out above that countercurrent elution in conjunction with a restrained bed is an essential part of the process of this invention. Another essential requirement of the process of this invention is that elution be carried out under pressure. Elution under pressure has several advantages when used in combination with a restrained bed and countercurrent elution. In the first place, the solubility of the sulphur dioxide in water increases with increasing pressure. Sulphur dioxide is a gas soluble to the extent of 8.6% in water at 25° C. and atmospheric pressure. With increasing pressure the solubility, and hence the bisulphite ion concentration, increases steadily to a maximum of somewhat over 24% sulphur dioxide at which point excess sulphur dioxide exists in the liquid state as a separate phase. The equilibrium pressure under these conditions is about 35 p.s.i.g. A sufficient excess of pressure should be used to obtain equilibrium quickly and to operate the column. For example, a pressure of 50 p.s.i.g. is suitable. Increased pressure, therefore, enables a more concentrated sulphur dioxide solution to be used. This concentrated sulphur dioxide solution results in a larger volume of product, or solution which can immediately be reused for pulping than if a weak solution of sulphur dioxide were used. A solution having an unduly low base content will require further treatment before it is reusable which may be by evaporation or as an alternative the solution could be fortified with additional sulphur dioxide and then recycled. For the usual acid sulphite mill system it is necessary for a reusable solution that the sodium concentration of the product cut be about 0.7% by weight. It is highly advantageous to eliminate the necessity for any such evaporation step and to minimize the amount of solution that requires recycling. One advantage, therefore, of using pressurized elution is that a high output of immediately reusable solution is provided.

Another advantage of pressurized elution in combination with a restrained bed and countercurrent elution is that more complete elution of the bed of ion exchange material results with consequent increased loading capacity and efficiency. A further important consequence of more complete removal of sodium from the ion exchange material is that there is less leakage throughout the loading step. In point of fact, it has been found with a restrained bed that a synergistic improvement in the conversion factor (base in load to base in product) is obtained. Thus it will be seen from Table IV that changing from concurrent operation to countercurrent operation at a 10% concentration of $SO_2$ in the regenerant solution improves the conversion factor from 0.51 to 0.64 or by 0.13; changing from 10% $SO_2$ to 20% $SO_2$ with concurrent flow improves the conversion factor from 0.51 to 0.61 or by 0.10, whereas changing from 10% $SO_2$ with concurrent flow to 20% $SO_2$ with countercurrent flow gives an improvement of from 0.51 to 0.81 in the conversion factor. The combined improvement in the conversion factor is thus 0.30 as compared with the additive improvement of 0.23 obtained by totalling the increments resulting individually from the increase in pressure and countercurrent flow. Pressure sufficient to provide a 10%–25% by weight solution of sulphur dioxide and preferably a 15%–20% solution of sulphur dioxide should be used.

Another advantages of eluting under pressure is that regeneration can be carried out substantially immediately after loading and without a long cooling off period. The hot waste liquor will raise the temperature of the bed and if pressure is not used during elution it will be necessary to cool the bed to avoid excessive volatilization of the sulphur dioxide. Even with elution under pressure, the regeneration should not be conducted at an excessively high temperature. A temperature of 70 to 85° F. is preferred.

Elution should be continued until the base concentration of the product fraction falls to the desired concentration for the reusable cooking liquor. Preferably the elution is continued beyond this point to minimize loss of base but with the resulting fraction being recycled for use in subsequent elution after fortifying with additional sulphur dioxide.

Washing following the absorption or loading stage is not necessary though it may be advantageous. The washing following the loading step can be carried out in a reverse direction to that of loading to save the spent liquor in the column at the end of the loading step. The resultant wash solution can be fed to the waste liquor storage. It is, however, preferred that washing follow the elution stage as otherwise leakage will be caused by sulphur dioxide remaining in the column. The wash water can be recirculated.

EXAMPLE I

The semi-pilot plant apparatus, used in this and all subsequent examples, consisted of a vertical 72" section of Pyrex glass pipe (2 inch I.D.) fitted at both ends with a flanged head containing a Saran screen to prevent loss of ion exchanger and piped to permit either upflow or downflow processing. The upper head was additionally fitted to allow back-washing of the bed into a headbox and the repacking of the ion exchange substance into the column as required. In operation the column contained 0.131 cu. ft. (1885 grams on a moisture-free basis) of Permuitit Q confined between the screens. The particle size of the Permutit Q was about 30 to 60 mesh. A positive delivery metering pump was used to pass all solutions through the bed at the desired rate. A back pressure regulating valve, situated down-stream from the column, was adjusted manually to maintain the system under any desired pressure in the range 0–50 p.s.i.g. The apparatus was amply supplied with hand-operated valves, pressure gauges, safety devices, sampling points, etc.

The complete ion exchange cycle consisted of loading, rinse, elution and rinse. During loading spent liquor of known base content, in just sufficient volume to give a definite break-through of sodium, was pumped in the desired direction through the bed followed immediately by water to displace residual spent liquor. Sodium was released from the Permutit Q resin by forcing sulphurous acid solutions, of known concentration and the desired volume, through the column in the desired direction followed by rinse water without interruption. In this manner the ion exchange material was returned to its former state in preparation for the next cycle. This, therefore, was typical of a continuous operation since no attempt was made to saturate the bed with sodium during loading or to denude it during stripping; rather it was meant to represent realistic operating limits.

The characteristics of a given cycle were obtained by taking frequent samples, when necessary under pressure. Sodium concentrations were determined by the flame photometer method using the 5890 A. wave length. Samples of the elution effluents, containing principally various proportions of sodium, sulphur dioxide and water, were analyzed by the Palmrose method also. (The Palmrose method is described in Paper Trade Journal 117, No. 2: 18–23, July 8, 1943.) Other data included pH, conductively, specific gravity and temperature readings.

In this and each of the examples, except where otherwise indicated, a packed bed was used. The equipment was designed to facilitate the production of a column or resin in which all particles were held firmly in the same position realtive to one another throughout many cycles of loading and elution. This rigidity was obtained by running water successively upflow and downflow through the bed which graded the bed and increased the packing density over that attained when the particles were allowed to settle by free fall in water. Once the bed was prepared the resin was kept immobile between Saran screens at the base and top of the column.

A typical sodium-base acid sulphite spent liquor, as obtained from the blow-pit of a commercial mull, had the following analysis.

| | |
|---|---|
| Specific gravity | 1.052 |
| Total solids percent | 12.8 |
| Total sulphur do | 0.92 |
| Total sulphate do | 0.18 |
| Thiosulphates do | 0.28 |
| Sodium do | 0.632 |
| Calcium do | 0.066 |
| pH as received | 2.64 |

Fibre and other coarse suspended material was removed by means of a 60 mesh side-hill screen. Because the calcium present in the mill liquor interfered with the determinaion of sodium values and greatly increased the analytical work, calcium and similar ions were eliminated by passing the liquor through a bed of Permutit Q in the sodium state. In this preparatory step the exchanger preferentially picks up calcium from the liquor, replacing it with sodium. After decalcification the liquor was stored in a covered wood stave tank.

The sulphite spent liquor used in this and all subsequent examples, unless otherwise specified, was from the same batch: Specific gravity—1.045; sodium—0.595%; calcium—nil; pH—2.6.

Sodium passing through the column was determined by taking 100 ml. samples as the treated liquor emerged; after 3, 6, 9, 12, 15, 18, 21 and 24 litres had passed the leakage was 20, 10, 45, 140, 366, 650, 990, and 1530 parts per million respectively. Later portions, amounting approximately to 2.0 litres were essentially unchanged and could be reused, or preferably the load volume could be reduced by this amount to reduce losses. No correction has been made to allow for this feature.

A 25.5 litre volume of liquor was pumped upflow through the bed, followed by 4.0 litres of water, at the rate of 393 ml. per minute. It was estimated that 127.4 grams of sodium was absorbed, equivalent to an adsorption efficiency of 84.2%. The adsorption capacity of the resin was calculated to be 2.19 pounds of sodium per cubic foot.

For release, 16.3 litres of sulphurous acid (20.0% $SO_2$ by weight) was pumped downflow, i.e.—specifically countercurrent to the loading flow, through the resin at a rate of 180 ml. per minute, with 5.0 litres of water following immediately. Total base eluted was found to be 123.9 grams or 97.3% of the sodium adsorbed; of this 118.3 grams was obtained in the product cut having an average of 1.03% of combined sulphur dioxide as estimated by the Palmrose method, i.e. 93.1% of the base released was converted to product.

In replicate experiments shown in Table I the following ranges of values were obtained: capacity—1.97 to 2.19; loading efficiency—76.1 to 85.6%; release efficiency—94.9% to 107.4%.

*Table I*

| Run No. | 1 | 2 | 3 |
|---|---|---|---|
| Load Volume, litres | 25.0 | 25.5 | 25.5 |
| Rinse Volume, litres | 6.0 | 2.5 | 3.3 |
| Flow Rate, ml./min | 390 | 393 | 327 |
| Sodium Loaded, gm | 148.5 | 151.5 | 151.5 |
| Sodium Leakage, gm | 34.5 | 24.1 | 21.7 |
| Sodium Adsorbed, gm | 14.0 | 127.4 | 129.8 |
| Adsorption Capacity | 1.97 | 2.19 | 2.18 |
| Adsorption Efficiency, Percent | 76.7 | 84.2 | 85.6 |
| Regenerant Volume, litres | 18.0 | 16.3 | 18.8 |
| Regenerant Concentration, Percent | 17.8 | 20.0 | 16.2 |
| Rinse Volume, litres | 5.0 | 5.0 | 9.1 |
| Flow Rate, ml./min | 200 | 87 | 200 |
| Regenerant Dosage, lb. $SO_2$/cubic foot | 58.8 | 54.8 | 55.4 |
| Total Base Eluted, gm | 122.4 | 123.9 | 122.6 |
| Elution Efficiency, Percent | 107.4 | 97.3 | 94.5 |
| Volume of Product Fraction, litres | 15.8 | 16.0 | 17.0 |
| Concentration of Product Fraction, Percent | 0.98 | 1.03 | 0.99 |
| Sodium in Product, gm | 111.0 | 118.3 | 120.8 |
| Product/Base Adsorbed, Percent | 97.4 | 93.1 | 93.1 |

EXAMPLE II

The liquor used in this experiment was from the same batch as that used in the preceding example but in this case the volatile acidic substances, principally sulphur dioxide in the free or loosely combined form, had been expelled by passing the heated liquor (208–212° F.) through a column packed with pall rings, countercurrent to a flow of steam. The treated liquor had 0.590% sodium content, and the pH was 3.5.

The evaluation was done in exactly the same manner as described in the preceding example. After 24.4 litres of spent liquor had been forced through the column followed by 3.6 liters of water, the amount of sodium adsorbed was found to be 126.3 grams, equivalent to 87.8% of the sodium intake. Resin capacity was 2.17 lb. sodium per cubic foot. For regeneration 18.0 litres of 19.5% sulphurous acid was passed through the column in the reverse direction after which water (6 litres) was applied as a rinse. The release was somewhat higher than that adsorbed—129.7 grams giving an elution efficiency of 102.5%. Of this 118.6 grams was obtained in the product fraction at a combined sulphur dioxide level of 1.05%. On the basis of experiments 1 and 2, it was concluded that steam stripping as a prerecovery step was not essential. The results are shown in further detail in Table II.

*Table II*

| Run No. | 4 | 5 | 6 | 7 |
|---|---|---|---|---|
| Load Volume | 26.0 | 24.4 | 25.6 | 26.0 |
| Rinse Volume | 3.0 | 3.6 | 4.0 | 4.0 |
| Flow Rate | 406 | 364 | 455 | 142 |
| Sodium Loaded | 154.5 | 144.0 | 150.5 | 153.5 |
| Sodium Leakage | 34.6 | 17.7 | 36.1 | 25.5 |
| Sodium Adsorbed | 119.9 | 126.3 | 114.4 | 127.7 |
| Adsorption Capacity | 2.06 | 2.17 | 1.92 | 2.14 |
| Adsorption Efficiency, Percent | 77.6 | 87.8 | 76.1 | 83.3 |
| Regenerant Volume | 19.1 | 18.0 | 17.6 | 18.8 |
| Regenerant Concentration | 19.22 | 19.5 | 18.5 | 20.5 |
| Rinse Volume | 4.9 | 6.0 | 5.5 | 5.6 |
| Flow Rate | 87 | 87 | 155 | 160 |
| Regenerant Dosage | 74.9 | 61.2 | 59.9 | 64.0 |
| Total Base Eluted | 116.3 | 129.7 | 130.4 | 134.0 |
| Elution Efficiency, Percent | 97.3 | 102.5 | 114.0 | 105.0 |
| Volume of Product Fraction | 14.0 | 15.8 | 15.5 | 17.0 |
| Concentration of Product Fraction | 1.01 | 1.05 | 1.06 | 1.01 |
| Base as Product | 101.6 | 118.6 | 118.0 | 123.1 |
| Product/Base Adsorbed, Percent | 84.8 | 93.8 | 103.0 | 96.6 |
| Flame Data: | | | | |
| Total Base Eluted, gm | 117.2 | 127.8 | 118.3 | 126.5 |
| Elution Efficiency, Percent | 97.9 | 101.2 | 103.2 | 99.3 |

EXAMPLE III

In this series of experiments the objective was to determine the operational characteristics of the resin under the influence of a wide range of regenerant concentrations.

In attempting to reach a steady state of performance, i.e., all sodium adsorbed during loading is released during stripping under comparable conditions of operation it was necessary to repeat each full cycle at least three times. In all cases the sequence illustrated in Example I was used: upflow loading, upflow rinse, downflow elution, downflow rinse at the flow rates indicated. Feed of a given regenerant to the column was stopped when the average combined sulphur dioxide in the effluent dropped below 1.0% since this represents the sodium bisulphite solution which can be usefully employed in the wood digestion cycle. Sulphur dioxide was kept in solution by setting the back-pressure valve somewhat above the vapour pressure of the system.

*Table III*

| Concentration of $SO_2$ in Regenerant Percent | 5 | 10 | 15 | 20 |
|---|---|---|---|---|
| Spent Liquor Fed, litres | 21.0 | 24.0 | 25.5 | 25.5 |
| Sodium Adsorbed, grams | 76.1 | 111.7 | 122.0 | 127.4 |
| Loading Efficiency, percent | 60.8 | 78.3 | 80.3 | 84.2 |
| Resin Capacity, lb. Na/cubic foot | 1.28 | 1.87 | 2.06 | 2.19 |
| Regenerant Fed, litres | 8.3 | 16.3 | 16.8 | 16.3 |
| Regenerant Dosage, lb. $SO_2$/cubic foot | 7.1 | 32.7 | 46.7 | 54.8 |
| Sodium eluted, grams | 67.4 | 116.2 | 124.0 | 123.9 |
| Elution Efficiency, Percent | 88.5 | 104.2 | 101.6 | 97.3 |
| Volume containing 1% Combined $SO_2$ litres | 6.5 | 14.5 | 15.0 | 16.0 |
| Sodium in Product, Grams | 50.4 | 103.8 | 112.0 | 118.3 |
| Conversion Factor (Load to Product) | 0.41 | 0.73 | 0.74 | 0.79 |

EXAMPLE IV

The effect of flow direction during the loading and elution phases of the base recovery cycles was investigated to ascertain whether or not the efficiency of the process was dependent on this factor.

The equipment, procedure, flow-rates, etc., were as illustrated in Example I with the modification that trials with countercurrent flow (upflow loading and rinse, downflow release and rinse) were followed by comparative trials on concurrent flow (downflow loading and rinse, downflow release and rinse). The effect was investigated with regenerants containing approximately 10 and 20% sulphur dioxide in aqueous solution.

*Table IV*

| | Concentration of $SO_2$ in Regenerant, approximate percent | | | |
|---|---|---|---|---|
| | 10 | | 20 | |
| Flow Direction | Counter-current | Con-current | Counter-current | Con-current |
| Spent Liquor Fed, Litres | 23.4 | 29.0 | 26.0 | 31.0 |
| Sodium Adsorbed, grams | 110.7 | 103.8 | 127.1 | 121.5 |
| Loading Efficiency, Percent | 79.5 | 60.2 | 82.4 | 65.9 |
| Resin Capacity, Lb., Na/cubic foot | 1.86 | 1.74 | 2.14 | 2.04 |
| Regenerant fed, Litres | 13.6 | 13.8 | 18.6 | 17.2 |
| Regenerant, Lb. $SO_2$/cubic foot | 22.7 | 24.8 | 63.6 | 57.9 |
| Sodium Eluted, Grams | 102.2 | 98.9 | 134.4 | 123.3 |
| Elution Efficiency, Percent | 92.6 | 95.3 | 105.8 | 101.6 |
| Volume Containing 1% Combined $SO_2$, Litres | 12.0 | 12.0 | 17.0 | 15.5 |
| Sodium in Product, Grams | 89.7 | 87.1 | 124.4 | 112.5 |
| Conversion Factor (load to product) | 0.64 | 0.51 | 0.81 | 0.61 |

EXAMPLE V

The effectiveness of the packed bed technique was determined by adding a two-foot section of 2 inch I.D. Pyrex glass pipe to the top of the column with the same ion exchange resin used in the previous examples. The void space made available in this manner allowed the particles freedom of movement during any upflow operation but fine particles impinged on the top screen and decreased flow rates resulted. There was also a tendency for the resin to form a plug downward from the screen and such particles no longer circulated since they formed a restrained bed. During the downflow operation no movement of the particles occurred.

*Table V*

| Type of Bed | Totally Restrained | Unrestrained Loading, Restrained Elution | Restrained Loading, Unrestrained Elution |
|---|---|---|---|
| Spent Liquor Fed, Litres | 25.5 | 23.0 | 28.0 |
| Sodium Adsorbed, Grams | 122.0 | 98.4 | 101.7 |
| Loading efficiency, percent | 80.3 | 72.0 | 61.1 |
| Resin Capacity, Lb. Na/Cubic foot | 2.06 | 1.65 | 1.71 |
| Regenerant Concentration, percent $SO_2$ | 15.4 | 14.6 | 14.4 |
| Regenerant Fed, Litres | 16.8 | 12.4 | 14.5 |
| Regenerant Dosage, Lb. $SO_2$/Cubic Foot | 46.7 | 32.6 | 37.6 |
| Sodium Eluted, Grams | 124.0 | 92.3 | 89.9 |
| Elution efficiency, percent | 101.6 | 93.9 | 88.4 |
| Volume Containing 1% $SO_2$, Litres | 15.0 | 10.0 | 9.0 |
| Sodium in Product, Grams | 112.0 | 74.0 | 64.6 |
| Conversion Factor (Load to Product) | 0.74 | 0.54 | 0.39 |

The embodiments of the invention in which an exclusive property or privilege is claimed are defined as follows:

1. A method of recovering values from the waste liquor of a process selected from the class consisting of neutral and acidic sodium, ammonium and magnesium base sulphite processes for producing wood pulp comprising the steps of forming a restrained bed of particles of a strongly acidic ion exchange material in the hydrogen form in which there is substantially no movement of the particles relative to each other, passing said waste liquor in one direction through said restrained bed to cause ions selected from the class consisting of sodium, ammonium and magnesium ions to be adsorbed by said bed and then eluting the bed by passing a solution of sulphur dioxide under pressure sufficient to maintain a concentration of sulphur dioxide of from 10 to 25% by weight through said bed in a direction opposite to said one direction to provide a solution containing said values in a sufficient concentration for the last mentioned solution to be reused for producing wood pulp.

2. A method of recovering sodium values from the waste liquor of a process selected from the class consisting of neutral and acidic sodium base sulphite processes for producing wood pulp comprising the steps of forming a restrained bed of particles of a strongly acidic ion exchange material in the hydrogen form in which there is substantially no movement of the particles relative to each other, passing said waste liquor in one direction through said restrained bed to cause sodium ions to be adsorbed by said bed and then eluting the bed by passing a solution of sulphur dioxide under pressure sufficient to maintain a concentration of sulphur dioxide of from 10 to 25% by weight through said bed in a direction opposite to said one direction to provide a solution containing said sodium values in a sufficient concentration for the last mentioned solution to be reused for producing wood pulp.

3. A method as in claim 1 in which said waste liquor has a pH of at least 2.5.

4. A method as in claim 3 in which said waste liquor is subjected to a preliminary decalcification treatment so as substantially to eliminate its calcium ions.

5. A method as in claim 4 in which said decalcification is conducted using a restrained bed of ion exchange material and countercurrent regeneration.

6. A method as in claim 1 in which said solution of sulphur dioxide has a concentration of from 15% to 20% by weight.

7. A method as in claim 1 in which said ion exchange material is sulphonated polystyrene.

8. A method as in claim 1 in which the restrained bed is washed following the eluting step.

9. A method as in claim 1 in which elution is carried out until the base concentration of the product fraction falls to the concentration of a reusable cooking liquor and elution is then continued with the fraction resulting from said continued elution being fortified with additional sulphur dioxide and recycled.

10. A method as in claim 2 in which the sodium values in said solution are about 0.7% by weight.

References Cited in the file of this patent

UNITED STATES PATENTS

| | | |
|---|---|---|
| 1,276,629 | Duggan | Aug. 20, 1918 |
| 2,656,244 | Gray | Oct. 20, 1953 |
| 2,736,635 | Haywood | Feb. 28, 1956 |
| 2,916,355 | Swenson | Dec. 8, 1959 |

OTHER REFERENCES

Markham et al.: "TAPPI," vol. 37, No. 8; August 1954, pp. 355–363.

Robinson: "TAPPI," vol. 39, No. 3; March 1956, pp. 182A–185A.